May 23, 1967 K. D. BROADBENT 3,321,751

MAGNETIC THIN FILM ELEMENT

Original Filed May 29, 1959 2 Sheets-Sheet 1

Kent D. Broadbent,
INVENTOR.
BY. Ernest F. Oberheim
AGENT.

May 23, 1967 K. D. BROADBENT 3,321,751

MAGNETIC THIN FILM ELEMENT

Original Filed May 29, 1959 2 Sheets-Sheet 2

Kent D. Broadbent,
INVENTOR.

BY.

Ernest F. Oberheim

AGENT.

United States Patent Office 3,321,751

Patented May 23, 1967

3,321,751

MAGNETIC THIN FILM ELEMENT

Kent D. Broadbent, San Pedro, Calif., assignor to Hughes Aircraft Company, Culver City, Calif., a corporation of Delaware Continuation of application Ser. No. 817,443, May 29, 1959. This application Dec. 20, 1963, Ser. No. 333,264
4 Claims. (Cl. 340—174)

This invention relates to magnetic devices and more particularly to magnetic elements comprising a plurality of thin film layers.

This application is a continuation of a copending application of Kent D. Broadbent, Ser. No. 817,443, filed May 29, 1959, now abandoned entitled, Magnetic Device, which copending application is a continuation-in-part of a further copending application of Kent D. Broadbent, Ser. No. 699,850, filed Nov. 29, 1957, now abandoned, entitled, Magnetic Device.

It has long been recognized that effective miniaturization could be achieved if electronic components could be formed by the vacuum deposition manufacturing technique. In complex devices such as digital computers, for example, such structures would be extremely useful since this method of manufacture would enable large numbers of components and circuits to be deposited simultaneously. Additionally, reductions in size of the components should reduce operating power requirements.

In general, a fundamental component in the electronic art is a device having two stable states. At present, an attractive bistable device is a simple toroid structure, the core of which may be placed in either of two opposite states of magnetic remanence by introducing an electrical current of appropriate polarity into an input winding. If a suitable choice of currently available core materials is made, the toroid exhibits the desired property of magnetic remanence retaining magnetization in either of two desired senses or directions. Thus, the conventional toroid is a device which is useful, for example, in digital computing circuits since it has two stable magnetic states. Many techniques for readout, that is, for determining the state of the toroid have been devised and are widely known.

This invention provides a novel magnetic device made of thin films. This device is similar to the toroid only in the sense that it exhibits bistable magnetic characteristics and differs therefrom in both principle of operation and structural organization.

It is accordingly an object of this invention to provide a novel and improved magnetic element having faster operation than conventional magnetic elements.

Another object of this invention is to provide a novel and improved magnetic element requiring relatively little power for operation.

A further object of this invention is to provide a novel and improved magnetic element exhibiting uniform magnetic path lengths throughout its construction.

A still further object of this invention is to provide a novel and improved magnetic element having two relatively low stable magnetostatic energy states and having relatively low magnetostatic transitional energy levels between the stable magnetostatic energy states.

Another object of this invention is to provide a novel and improved magnetic element constructed of thin films and requiring a minimum of surface area.

Still another object of this invention is to provide a novel and improved magnetic element constructed of thin films disposed in a complementary magnetic plane configuration.

Further and additional objects and advantages will become apparent hereinafter during the detailed description of an embodiment of the invention illustrated by way of example in the accompanying drawings, wherein.

Figures 5, 6, 7:
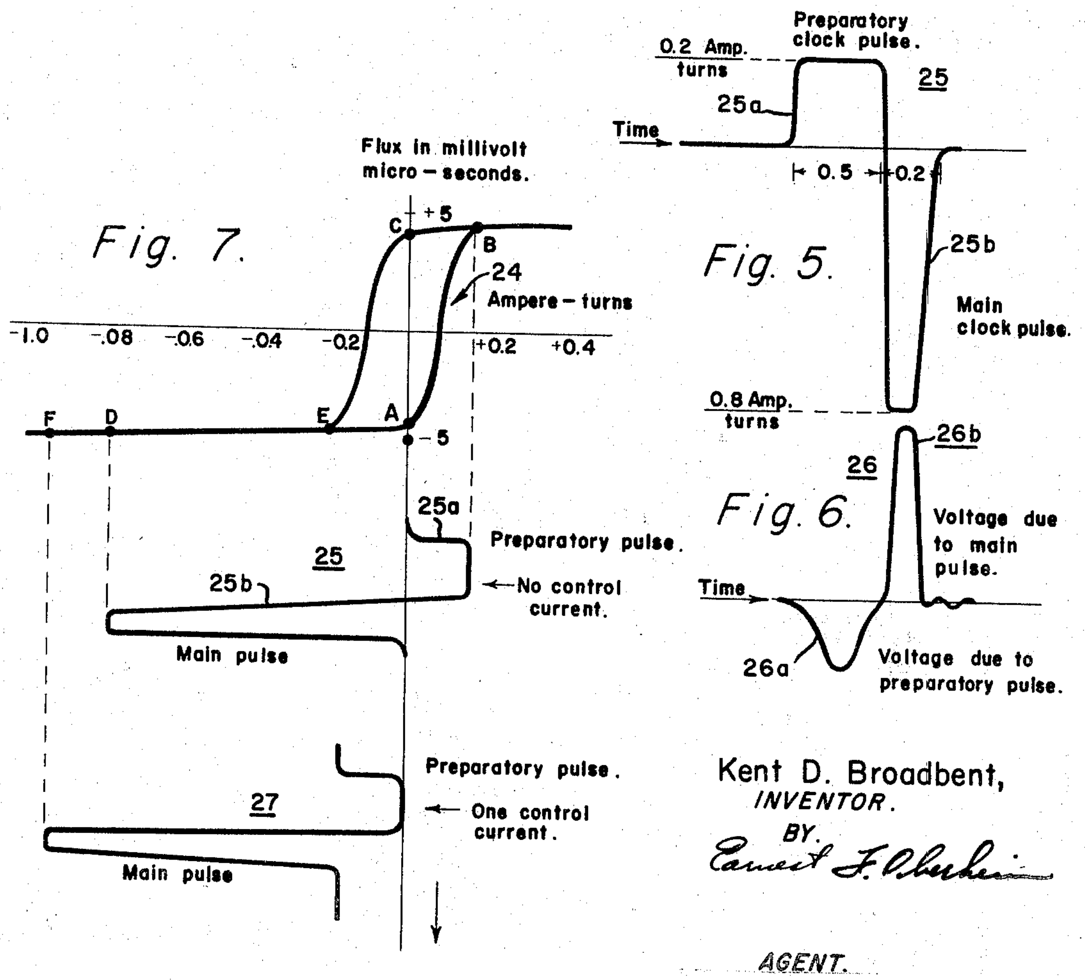
FIG. 5 is a graphical representation of a typical input signal waveform applied to a bistable magnetic element such as illustrated in FIGS. 3 and 4.

FIG. 6 is a graphical representation of a typical output waveform resulting from the application of the waveform of the type of FIG. 5 to the bistable magnetic element of this invention; and FIG. 7 is a graphical representation of a typical rectangular hysteresis characteristic of a bistable magnetic element with the input waveforms of FIG. 5 positioned on the vertical axis, plotted as a time axis, in conformance with the value of the applied magnetomotive force positioned on the horizontal axis.

In order to achieve a bistable magnetic device with a deposited layer structure, the most obvious approach is to deposit a two-dimensional toroid on a suitable substrate. However, this type of configuration has certain disadvantages. In the toroid the output which can be realized depends upon the cross-sectional area of the toroid core. To achieve a reasonable cross-sectional area with an essentially two-dimensional structure, it is necessary that the surface area of the deposited structure be relatively large. An increase in the surface area is not a desirable expedient since current electronic development seeks the smallest feasible component size because of the enormous complexity of the final product. Thus, the increase of component surface areas is incompatible with design requirements. A second reason is that the toroid has certain speed disadvantages which will be discussed below.

It is evident from the present state of the electronic and particularly of the electronic computer art and the general attempt to improve this type of equipment, that speed of operation is a most important consideration. Speed increases are realizable with thin film devices of the type described in this application. However, a vacuum deposited thin film toroid, as discussed above, does not provide any increase in speed of operation. Switching speeds and switching power requirements in a conventional toroid are dependent in part upon core configuration. If a toroid is deposited such that a sufficiently large cross-sectional area is achieved without a large ratio between the inner and outer radii, either the outer radius must be made extremely large and more inefficient with regard to space requirements, or the inner radius must be made relatively small compared to the outer radius. If the second choice is made in an effort to achieve the advantage of smaller size, the magnetic path length at points near the inner radius is very much shorter than the magnetic path length at points near the outer radius. The effect of this difference in path length is more inefficient operation since, for a given current, the time required to reverse the direction of magnetization of the toroid is dependent on the coercing field, which is in turn dependent on the path length. Since the frequency of operation is controlled at its upper limit by the time required to reverse the direction of magnetization at relatively low coercing fields corresponding to relatively long path lengths, the frequency of operation of the device will be controlled by the longest path length. Such a structure thus provides relatively inefficient operation.

The energy required to reverse the direction of magnetization of a toroid in order to drive the toroid from one stable state to another is undesirably high. When the toroid is saturated in either direction, the magnetostatic energy of that stable magnetic state is zero. However, in the toroid the transition from one stable magnetic state to the other requires that the core be forced through a complex mode of magnetic pole rotation involving a transition through relatively high magnetostatic energy levels. Thus, a relatively large amount of energy must be supplied to force a change from one saturated remanent state to a reverse saturated remanent state.

Finally, consider the output from this toroid device. In any magnetic circuit the upper limit of the thickness of a layer or lamination is limited by eddy-current losses which becomes serious, with the materials and frequencies here contemplated, if the thickness of a layer is much greater than 25,000 A. The achievement of a reasonable output voltage poses a difficult problem since the output voltage of a toroid depends on the cross-sectional area of the magnetic material coupled to its output winding. Since the upper limit of thickness is fixed, it is necessary to increase the surface area of the toroid in order to increase output. However, an increase in surface area requires a corresponding increase in input current. Thus, in order to get a useful output voltage, the surface area of the deposited toroid must be increased and the increase must be paid for by increased input current requirements.

Figures 1, 2:
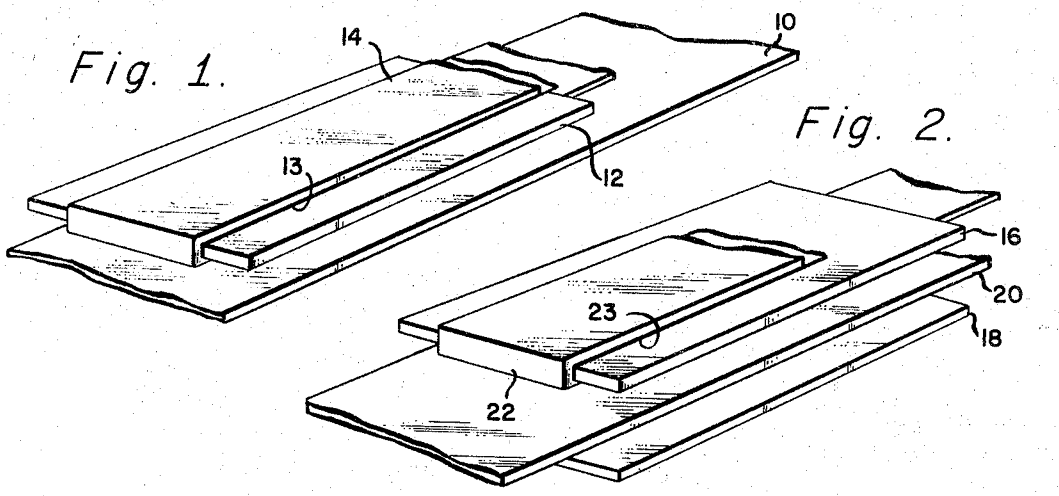
FIG. 1 is a distorted perspective view of a thin film magnetic element in accordance with the present invention, detached from its substrate.
FIG. 2 is a distorted perspective view of a thin film magnetic element, detached from its substrate and including complementary magnetic plane structure.

It has thus been demonstrated that the deposition of a two-dimensional toroid will not yield an efficient device of the character required. FIG. 1, which is greatly distorted in dimension (aspect ratio) shows a first approach to a more useful device and consists of a conductive sheet 10 and an additional superimposed magnetic sheet or plane 12 suitably insulated therefrom. For the purpose of this description it will be assumed that both the magnetic and conductive sheets are rectangular in form and equal in dimension. However, other configurations are also possible. FIG. 1 also shows an output winding 14 looped about the magnetic sheet 12 and insulated therefrom by an insulating layer 13.

When an electric current is introduced into the conductive sheet 10, a magnetic field will be produced around the conductive sheet 10 in a direction perpendicular to the flow of current. The magnetic field surrounding the conductive sheet 10 will induce a corresponding magnetization of the magnetic sheet 12. If the direction of the current is reversed, the direction of the induced magnetic field will also be reversed and the change of the direction of magnetization of the magnetic sheet 12 will produce an output voltage in the output winding 14.

First, note that the magnetic path lengths throughout the magnetic sheet are uniform. Thus, the inefficiency due to varying path lengths is eliminated. It can also be shown that due to the fact that the width of the magnetic sheet is large compared to the thickness of the sheet a relatively low magnetostatic energy state results for all orientations of the over-all magnetization vector. Hence, no high transitional energy levels must be traversed in a reversal of the direction of magnetization of the sheet. However, the magnetostatic energy of the two stable states is not zero, as would be the case with a toroid, but is rather a relatively small value greater than zero.

It can be appreciated also that if more output voltage is desired, the length of the magnetic sheet can be increased without increasing the input current necessary. Thus, an increase in output voltage can be achieved without a corresponding increase in input current.

Although the above-described device has many advantages over a toroid element, it is not the smallest device that can be made. The minimum width of a device employing a single magnetic sheet must be at least that required for the sheet to be magnetically retentive. For example: if the thickness of the magnetic sheet is 8,000 A., the coercive force is 1 oersted, and the remanent B value is 7,000 gauss, the minimum width for a typical magnetic material would be approximately 0.2 inch.

It is well known that any material which has been magnetized is subject to a self-demagnetizing force. Since the magnetostatic eenrgy is in a general sense inversely proportional to the width of the device, the wider the device the lower the magnetostatic energy, assuming length and thickness to remain constant. If the width of the device is reduced, a condition will be attained in which the magnetostatic energy becomes so high that the device will become unstable and will no longer retain magnetization properties which provide single magnetic domain terminal states. Since such single domain terminal states are required for providing stable states, this lower limit of width must be avoided. The calculation of the theoretical minimum width for the planar case is an extremely complicated and difficult mathematical problem; however, approximate solutions have been obtained for this case, and experimental results have shown these calculations to be reasonably close to observed values.

The device shown in FIG. 2, which is also distorted in aspect ratio, provides a structure which preserves all of the advantages of the planar structure described above but permits a reduction in minimum width by a factor which has been experimentally verified to be in the vicinity of 10, with a corresponding decrease in input current. In FIG. 2, two magnetic sheets 16 and 18, called herein complementary planes, are used instead of the single sheet 12 of the FIG. 1 device. The conductive sheet is shown as 20 in FIG. 2 and the output winding is shown as 22. The output winding 22 is suitably insulated from the magnetic sheet 22 by an insulating layer 23.

The operation of the device shown in FIG. 2 is similar to that of the device of FIG. 1. An electric current is introduced into the conductive sheet 20 producing a magnetic field surrounding the conductive sheet. This magnetic field will induce magnetization of the magnetic sheets 16 and 18. However, the magnetization of the magnetic sheet 18 will be opposite in direction to the magnetization of the magnetic sheet 16. If the direction of the current in the conductive sheet 20 is reversed, the direction of magnetization of the magnetic sheets 16 and 18 will also be reversed and an output voltage will be induced in the output winding 22.

Minimum separation of the magnetic sheets is also necessary for the proper functioning of this device since the greater the separation of the magnetic sheets, the less the reduction in minimum width. Such separations are ideally produced by the vacuum deposition techniques here employed. In fact, in practice the ends of the two complementary planes are made immediately adjacent, if possible. This provides the minimum possible separation of the two sheets since actual magnetic continuity is not physically realizable because of oxide layers formed on the magnetic sheets as deposited, and because of other factors such as the extremely small radius of curvature between the adjacent magnetic sheets. However, actual magnetic continuity is neither necessary nor desirable for the operation of this device, and the device employing adjacent planes is the optimum device which can be fabricated.

Summarizing the differences in elementary principle between both the conventional and thin film toroid discussed above and the magnetic device taught by the applicant, the toroid configuration provides a magnetic flux path of varying length in which the magnetostatic energy is zero in either of its two stable magnetic states but which configuration inheres a complex high energy switching mode. On the other hand, applicant's device provides vanishingly small finite terminal energy conditions in each stable magnetic state and inheres a homogeneous mode of rotation of magnetic poles for switching between the stable magnetic states, with no high energy switching mode due to complicated demagnetization configurations. This mode of operation which differs markedly from both the conventional and thin film toroid configurations is a function of the structural organization taught by applicant which structural organization is completely different from the toroid configuration.

Investigations have been conducted into the magnetic behaviour of ferromagnetic films deposited on substrates. One such investigation is reported in the Journal of Applied Physics, volume 26, August 1955, and is entitled "Preparation of Thin Magnetic Films and Their Properties," by M. S. Blois, Jr., at pages 975 through 980.

The devices shown in FIG. 1 and FIG. 2 may be manufactured by successive applications of the vacuum deposition technique in which each of the respective magnetic, insulative and conductive layers are superimposed in an appropriate order. The magnetic layers may be composed of permalloy material and have a thickness of approximately 6,000 A. The conductive layers may be composed of aluminum and the insulative layers of silicon monoxide. The thickness of the conductive and insulative layers may be approximately 10,000 A.

The thickness of the magnetic film layers is governed at the lower limit by the disappearance of ferromagnetic properties while the appearance of significant eddy-current losses at the relatively high frequencies used in digital computing devices governs the upper limit of said thickness.

Upon obtaining a desirable thin film magnetic structure, it is still necessary to reduce the entire device to thin films, along with any associated conducting portions needed for interconnections with other parts of a system to present a commercially acceptable device. To provide such a commercially desirable thin film structure, however, involves the solution of additional problems above and beyond those required to transform the magnetic elements to thin films. The use of complementary planes makes it possible to preserve the advantage of very intimate coupling of the windings to the magnetic circuit and thereby minimizes inductive noise picked up. This intimate spacing, however, results in high interwinding capacitance which, in some instances, has a coupling effect on an associated computing circuit. These coupling problems must be avoided without introducing any undesired effects on the operation of the magnetic device.

An elemental structure providing the magnetic circuit for the vacuum deposited configuration performing the function of an "and" gate is shown in FIG. 2. The structure of FIG. 2 consists of a pair of substantially rectangular magnetic films 16 and 18 superimposed upon one another in such a manner as to be in direct contact, if feasible, or separated only in an amount providing vanishingly small terminal energy in each magnetic stable state. If a multiplicity of electrically insulated films or layers of conductors is passed between the superimposed magnetic layers 16 and 18, in place of the single conductive film 20 shown in FIG. 2, the device will function as an "and" gate. The conductive layers must be insulated from the magnetic circuit by insulative layers disposed on opposite sides thereof.

Figure 4:
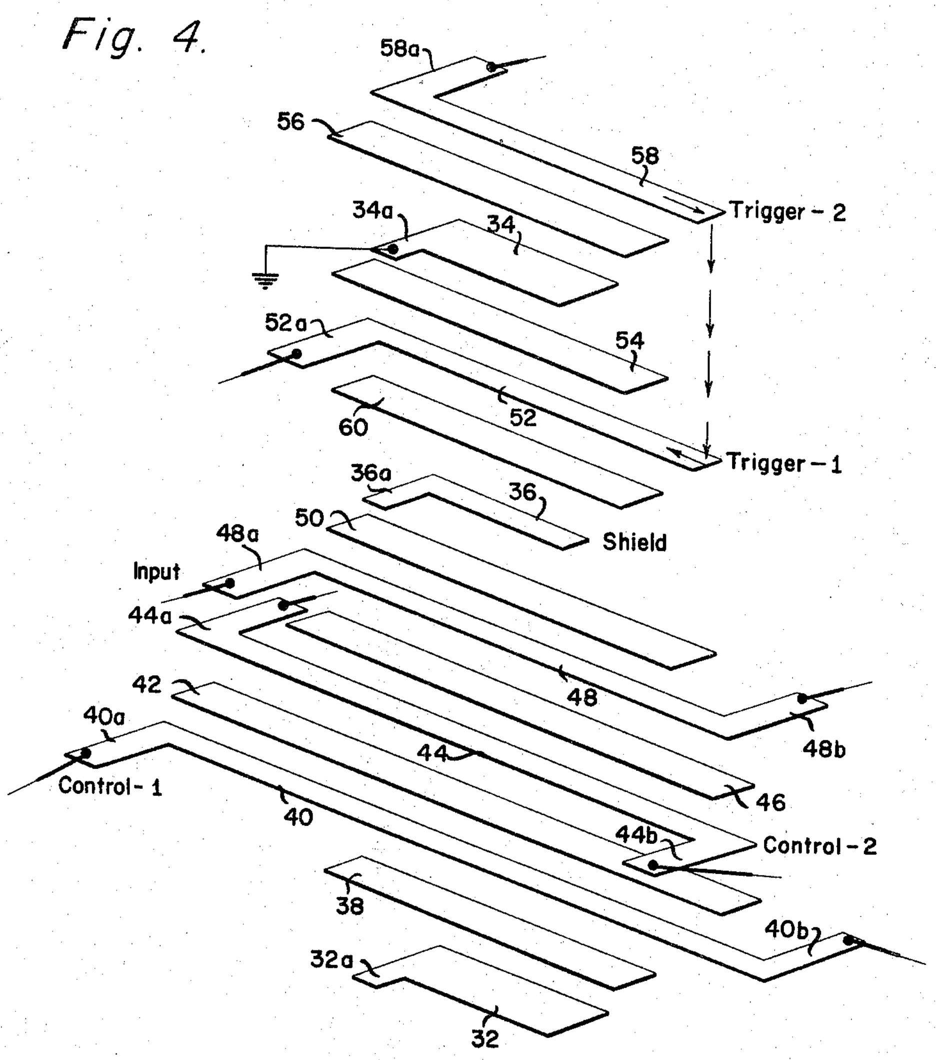
FIG. 4 is an exploded and enlarged view of the thin film layers comprising the magnetic element of FIG. 6 and indicating a sequential order of deposition.
Figure 3:
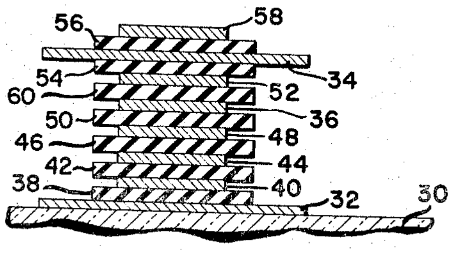
FIG. 3 is an idealized enlarged vertical sectional view removed from a thin film structure of a gating element embodying the invention and indicating a sequence of evaporation.

The description of the physical organization of a magnetic gating element will now be examined with particular reference to FIGS. 3 and 4, which are a vertical sectional view and an exploded view, respectively, of a gating element embodying this invention.

The embodiment of this invention shown in FIGS. 3 and 4 uses the elemental structure shown in FIG. 2. It should be understood, however, that the elemental structure shown in FIG. 1 would also function in a similar manner; however, the particular advantages afforded by the use of the FIG. 2 structure have already been enumerated and described.

It should be further understood that although the particular embodiment of this invention illustrated in FIGS. 3 and 4 has the edges of the two magnetic films in overlapping relationship, this overlapping is not necessary to the proper functioning of this apparatus as has been pointed out hereinbefore.

Since the entire magnetic structure is reduced to thin films, a carrier or substrate 30 is required. The choice of a suitable substrate is made according to the considerations referred to in the aforementioned Blois article. For the purposes of this invention, a suitable substrate has been found to be commercially available soft glass which is an insulative medium as required. However, other insulating materials able to withstand higher temperatures may be used.

The magnetic gating element in this instance comprises fifteen vacuum evaporated thin film layers, each layer having either magnetic, electrically conductive or insulative properties. This total number of layers results from the fact that there has been included only a pair of control windings providing a two term "and" gate.

In FIG. 3 the magnetic layers 32 and 34 which correspond in function to layers 16 and 18 of FIG. 2 may comprise permalloy films 0.2 inch long and 0.025 inch wide. Between the magnetic layers 32 and 34 are a plurality of insulative and conductive thin film layers. The layers are suitably deposited on the substrate 30 over the magnetic layer 32 so as to define in an insulative relationship two control windings, an input winding and a trigger winding. The trigger winding forms a loop around the magnetic layer 34, as will be described more fully hereinafter. A thin film conductive layer 36, acting as an electrostatic shield, is also deposited intermediate the magnetic layers 32 and 34.

Deposited immediately over the magnetic layer 32 is an insulative layer 38, which may be a layer of silicon monoxide. The insulative layer 38 has a width of 0.015 inch and is arranged centrally over the longitudinal center line of the magnetic layer. The insulative layer 38 extends outwardly of the ends of the magnetic layer 32. The first control winding is formed by the conductive layer 40, deposited immediately over the insulative layer 38 so as to be completely insulated from the magnetic layer 32. To this end the conductive layer 40 has a width of 0.010 inch and is deposited centrally of the insulative layer 38 with its opposite end sections extending outwardly of the insulative layer 38. These end sections may be adapted for connecting an electrical lead wire to the external circuitry in any suitable manner, such as by tabs **40*a* and 40*b***.

In a similar fashion, the fourth through eighth layers are alternately arranged as insulative and conductive layers to define the remaining electrically isolated control winding and the input winding. The insulative layers are identified by the reference characters 42, 46 and 50, having the same dimensions as the insulative layer 38. The conductive layers 44 and 48 deposited intermediate these insulative layers have the same dimensions and are arranged similarly to the conductive layer or control winding 40. The second control winding is formed by the conductive layer 44 including tabs **44*a* and 44*b*, deposited intermediate the insulative layers 42 and 46, while the clock winding is formed by the conductive layer 48 including tabs 48*a* and 48*b* deposited intermediate the insulative layers 46 and 50**.

The ninth layer to be deposited is the electrostatic shielding layer 36, a conductive layer. The layer 36 has a width of 0.010 inch and extends outwardly at one end **36*a*, the right-hand end as viewed in FIG. 3, between the magnetic layers 32 and 34. The purpose and function of this shielding layer 36 will be examined more fully hereinafter. The tenth layer, insulative layer 60**, has the same dimensions as the remaining insulative layers and is similarly arranged in the thin film structure.

A portion of the trigger winding is defined by the conductive layer 52 which is deposited immediately over the insulative layer 60. The trigger layer 52 has the same dimensions as the remaining conductive layers and is similarly arranged. The trigger layer 52 is provided with a tab 52*a* at the left-hand end section for connections to external circuitry. The twelfth layer is an insulative layer 54, similar to the remaining insulating layers and arranged immediately below the magnetic layer 34. The insulative layer 56 is similar to the layer 54 and is deposited immediately above the magnetic layer 34 such that the fifteenth and final layer 58 is allowed to electrically contact the layer 52. The layer 58 is a conductive layer provided with a tab 58*a* at the left-hand end section and having its right-hand end section engaging the corresponding portion of the layer 52. The conductive layer 58 in combination with the conductive layer 52 define the trigger winding for the magnetic element. This arrangement of layers 52 and 58 is such that the insulative layers 54 and 56 have their right-hand end sections, as shown, terminating inwardly over the right-hand end sections of the layers 52 and 58. This construction of the layers 52 and 58 causes them to come into intimate contact and to define a closed electrical circuit extending from the left-hand end section or tab 58*a* longitudinally through the layer 58 and back through the layer 52 to the tab 52*a*.

The over-all thickness of the magnetic element, detached from the substrate 30, is on the order of 0.0006 inch and has a length of approximately 0.2 inch. The thickness of the various magnetic layers is approximately 6,000 A. while the thickness of the conductive and insulative layers is on the order of 10,000 A. It should be noted that in the actual completed thin film structure, the ends of magnetic layers 32 and 34 are permitted to overlap and do not appear as shown in FIG. 3.

Due to the intimate coupling provided by this thin film construction the normal inductive noise picked up is at a minimum. However, it has been found that interwinding capacitance is a factor which must be considered. In this instance the shielding layer 36 is used to minimize the effect of interwinding capacitance. Since the shielding layer 36 has the same width as the conductive layers and is insulated therefrom, electrical continuity is provided between the shielding layer 36 and the magnetic layers 32 and 34 by the engagement of tabs 32*a* and 34*a* for the magnetic layers and the tab 36*a* for the shielding layer. At the point of engagement it has been found convenient to connect the layers to ground or a point of common potential having very low input impedance. This connection has the effect of minimizing the capacitive coupling effects of the trigger winding. The tabs 32*a* and 34*a* for the magnetic layers 32 and 34, respectively, have negligible effect on the operation of the magnetic circuit.

The vacuum evaporation technique employed in constructing this novel magnetic element is conventional and well-known in the art. Suffice it to say for the purposes of this invention that the magnetic element may be built up by the sequential evaporation of each thin film layer by means of individual masks having the configuration of the desired layer to be deposited. However, thin film devices may also be produced by other techniques than vacuum deposition. For example, the required configurations of conducting, insulating, and magnetic films may be produced by such processes or combinations of processes as electrodeposition, electrophoresis, silk screening techniques, or various inking, etching, and printing techniques which allow thin planes of materials to be defined, registered and applied upon a sub-surface.

It should be noted that the dimensions indicated hereinabove for the various thin film layers are not to be construed as limited thereto but are merely indicative of a preferable structure compatible with thin film considerations. The order of depositing the control and input windings may also be varied from the order described. It will now be appreciated that the before-described relationship of fifteen vacuum deposited layers defines a logical "and" gate in term of thin films.

The method of operation which has been used with the present invention has been described in a copending application, Ser. No. 725,753, filed Apr. 1, 1959, now Patent No. 3,119,023, entitled "Magnetic Gating System," by Harold R. Kaiser. While the magnetic gating scheme of Kaiser's was described in connection with a magnetic core gating structure, it has been found suitable for use with the present invention. However, while the method of operation described yields particularly successful results with apparatus constructed according to the teachings of this application, other more conventional methods of operation which may also be employed with this apparatus may be found described in chapter 5 of a book entitled, "Digital Components and Circuits," by R. K. Richards, Princeton, N.J., D. Van Nostrand Company, Inc., 1957.

FIG. 7 shows the substantially rectangular hysteresis characteristic of the material used in the magnetic sheets 32 and 34 of FIG. 3. The hysteresis characteristic is plotted with the abscissa defined as the magnetomotive force in ampere-turns and with an ordinate defined in terms of the flux in millivolt microseconds. This hysteresis characteristic is identified by the general reference character 24. The structure shown in FIGS. 3 and 4 is provided with a plurality of conductive elements arranged therein so that the structure will function as a logical "and" gate. The elements include an input element 48 magnetically coupled to magnetic layers 32 and 34, an output or trigger element indicated by reference characters 52 and 58, and a pair of control elements 40 and 44. The number of control elements on any logical "and" gate will depend on the particular logic to be mechanized.

The input element is connected to a clock pulse source, not shown, which provides a clock pulse having a waveform 25 substantially as illustrated in FIG. 5, in which the abscissa is defined in terms of time and the ordinate is defined in terms of magnetomotive force in ampere-turns. This clock pulse waveform 25 differs from conventional clock pulse waveforms in that the application of a pulse defined in this manner causes the magnetic layers 32 and 34 to make a complete excursion around the hysteresis characteristic 24 shown in FIG. 7 upon each application of the waveform 25 to the magnetic layers, whereas in conventional methods of operation of magnetic circuitry of this type a clock pulse is generally used to switch a magnetic element from one stable configuration to another.

The clock pulse 25 comprises two portions: a positive portion identified as a preparatory clock pulse 25*a*, and a negative portion identified as the main clock pulse 25*b*. The preparatory clock pulse 25*a* applies positive ampere-turns to the magnetic layers 32 and 34, while the main clock pulse 25*b* applies negative ampere-turns to the layers. The clock pulse 25 is generated such that the volt-time integral per turn generated in the trigger element, layers 52 and 58, by the preparatory clock pulse 25*a* is equal and opposite to that generated in the trigger element by the main clock pulse 25*b*. This volt-time integral has a value equal to twice the saturation flux of the magnetic layers.

The operation of an "and" gate will be explained, assuming first that there is no current applied to any of the control elements. Upon the application of the clock pulse 25 to the input element 48, the magnetic layers will respond thereto by traversing the hysteresis loop 24 from the point A through the saturation point B and back through the points CEDE, and from saturation point E back to the original position of remanence at point A. This traversal of the hysteresis loop 24 may be understood from an examination of the clock pulse 25 plotted on the same vertical axis as the loop 24 and immediately therebelow. This vertical axis represents the passage of time, increasing from top to bottom while the horizontal axis represents magnetomotive force in ampere-turns. By the before-described traversal of the hysteresis loop 24 a voltage will be induced in each of the elements coupled to the magnetic layers, including the trigger element defined by the layers 52 and 58. The voltage derived from the trigger element may be utilized, for example, to "trigger" a conventional bistable transistor circuit. A typical output waveform 26 derived from the trigger element upon the application of the clock pulse 25 is shown in FIG. 6, in which the abscissa represents the passage of time and the ordinate represents voltage. The negative portion 26*a* of the output waveform corresponds to the application of the preparatory clock pulse 25*a* to the trigger element, resulting in an output voltage of relatively small amplitude. The voltage generated by the application of the main clock pulse 25*b* to the trigger element is a sharp spike, as shown by the positive portion 26*b* of the output waveform 26.

Assuming now that a current is applied to at least one of the control elements, such an application of current effectively biases the magnetic layers to a saturation point; in this instance, the point E on the hysteresis characteristic 24 will be selected. This biasing effect from the application of a control current to a control element is shown in FIG. 7 by the displacement to the left of the clock pulse with respect to the vertical time axis as shown at 27. Upon the application of the clock pulse 25 to the input element 48, the magnetic layers will now traverse only the minor loop EAEFE, and theoretically the flux in the magnetic layers will remain essentially unchanged. The preparatory clock pulse 25*a* will merely drive the magnetic layers from the saturation point E to the remanent point A and allow the layers to return to the point E. The main clock pulse 25*b* merely drives the magnetic layers further into saturation to the point F and returns the layers to the saturation point E. Accordingly, the voltage induced in the elements coupled to the magnetic layers during energization of a control element will be essentially zero. Actually, however, a small voltage will appear in the trigger element. The application of current to more than one control element simultaneously will effectively bias the magnetic layers further into the negative ampere-turn direction so that no output voltage results from the application of the clock pulse 25.

The usage of the term "and" gate in accordance with this gating scheme will now be explained. The magnetic layers will function as an "and" gate to produce a desired triggering signal when no currents are applied to any of the control elements. If current is introduced into a control element the preparatory clock pulse 25*a* will be inhibited so as to produce substantially no output signal at the trigger element. If the currents in the control elements are denoted by $Q^1, Q^2 \ldots Q^n$, where $Q^1=1$ indicates the absence of current, there will be voltage induced in the elements and in particular in the trigger element during the existence of the clock pulse 25 only when $$Q^1, Q^2 \ldots Q^n=1$$

If the presence of a voltage pulse in the trigger element is denoted by $J=1$ then $$J=Q^1, Q^2 \ldots Q^n$$

Therefore, the magnetic structure shown in FIGS. 3 and 4 will act as an "and" gate of "*n*" terms, limited only by the number of controls provided. The connection of all the trigger elements in series circuit relationship with a plurality of similarly defined "and" gates will define an "or" circuit thereby allowing all of the "logic" of a computer to be constructed in terms of these "and" and "or" gates.

A magnetic gating element as disclosed hereinabove has been successfully operated with the clock pulse waveform 25 applied to the input layer 48 and an output waveform at the trigger circuit identical to output waveform 26 has been obtained. It will now be appreciated from the above description that the thin film embodiment is a single turn embodiment and the current values are readily determined therefrom. Accordingly, the preparatory clock pulse 25*a* is seen to be proportioned to have a current value of 0.2 ampere while the main clock pulse 25*b* is proportioned to have a current of 0.8 ampere. These currents are of a value consistent with operating currents for presently commercially available transistors.

The layout of the conductive layers 40, 44, 48, 52 and 58 is arranged so that their respective tab portions are in staggered insulative relationship to prevent any undesired electrical interaction between the circuits. It should also be noted that any "logical" structure which may be expressed in terms of "and" and "or" gates may be deposited on the substrate 30. The common portions of the "and"—"or" arrangements, such as the serial relationship of the "trigger" windings, may be deposited as one continuous layer on the substrate 30. For example, the conductive layer 58 will not terminate at tab 58*a* but instead will be extended through an adjacent "and" gate to form a portion of the trigger winding therefor. In this fashion, transistor circuits using thin film "logic" may merely be connected to the lead wires from the substrate 30.

Another device which can be constructed with thin films according to this invention is a magnetic storage element. Such a basic storage element, utilizing conventional toroids, will be found described in Richards, cited above, in chapter 8. If the layers 44 and 46 of FIG. 4 are omitted in the construction of the device described in FIG. 4, a magnetic storage element suitable for use in devices of the character described in the above publication is obtained. It should be noted, however, that such devices are in general subject to the limitation of a required selection ratio as described in the reference.

In general the details of construction disclosed herein for a magnetic storage element permit the manufacture of a basic element similar to the basic magnetic core in that such a magnetic element may be used in a great variety of other devices such as shift registers. The magnetic element disclosed herein can be used in nearly all situations where the basic magnetic core can be used while providing the advantages herein pointed out.

In the embodiment of the magnetic storage element described above, a rectangular shape of the deposited layer was specified. Such a shape does provide some of the advantages enumerated, such as uniform magnetic path lengths and relatively efficient control of output voltage as well as speed of operation well in excess of speeds obtainable with conventional core elements. However, in general, the rectangular shape is presently believed to be less than optimum if speed of operation is the most important factor to be achieved. In such a case, other shapes of the magnetic layers have been shown to be more useful. Successful operation has been obtained with circular or oval configurations at speeds far in excess of anything presently obtainable with conventional core devices.

The magnetic element herein described is capable of assuming an unlimited number of stable magnetic states since in theory each possible orientation of the magnetic vector could represent a stable magnetic state. However, the proper functioning of such a device would require the magnetic medium to be substantially isotropic. Such a device might find use in an analog computer.

It will now be appreciated that a novel and improved thin film magnetic element has been disclosed. The thin film magnetic element may preferably employ a pair of complementary magnetic planes deposited so as to provide intimate magnetic coupling, ideally in contact along a pair of edges on opposite sides of the current sheet or film. Such a device provides, in a thin film configuration, a plurality of stable magnetic states, each of said states having a relatively low magnetostatic energy and affording relatively low energy high-speed switching.

What is claimed is:

1. A magnetic element deposited on a substrate in terms of thin film layers having essentially two dimensions comprising, a pair of spaced-apart complementary layers having magnetic properties, the thickness of said layers being greater than the minimum required to exhibit ferromagnetic properties and less than that thickness at which eddy-current losses in said material become significant, a pair of insulative layers disposed intermediate said magnetic layers and dimensionally defined with respect to said magnetic layers to have one dimension larger and one dimension smaller than said magnetic layers whereby said latter mentioned layers lap along two sides, and a conductive strip layer interposed between said insulative layers, extending in a direction between said two sides, and arranged therewith to be completely insulated from said magnetic layers.

2. A magnetic element comprising, an insulative substrate, a thin film magnetic layer having a predetermined width disposed on said substrate, the thickness of said layer being greater than the minimum required to exhibit ferromagnetic properties and less than that thickness at which eddy-current losses in said material become significant, an insulative thin film layer having a width smaller than said magnetic layer and longer than said layer disposed on same substantially centrally thereof, a thin film conductive layer having a width smaller than said insulative layer and extending lengthwise outwardly of said magnetic layer for electrically connecting thereto disposed on said insulative layer substantially centrally thereof, another thin film insulative layer of substantially the same dimensions as said first mentioned insulative layer overlying said conductive layer, and another thin film magnetic layer having a width and thickness substantially the same as said other magnetic layer disposed in intimate relationship with said latter mentioned layer.

3. A thin film element defining a "logical" gating element completely in terms of thin film layers disposed on a substrate, said element including a pair of spaced-apart complementary planar magnetic layers having similar predetermined magnetic and dimensional characteristics, the thickness of said layers being greater than the minimum required to exhibit ferromagnetic properties and less than that thickness at which eddy-current losses in said material become significant, a capacitive shielding layer disposed and arranged intermediate said magnetic layers for engaging said magnetic layers at a predetermined point, a plurality of electrically isolated conductive layers disposed intermediate one of said magnetic layers and said shielding layer, another electrically isolated conductive layer disposed intermediate said shielding layer and the other magnetic layer.

4. A thin film element defining a "logical" gating element completely in terms of thin film layers disposed on a substrate as defined in claim 3 wherein said shielding layer is a conductive layer and said last mentioned conductive layer comprises, a pair of conductive layers disposed on opposite sides of said other magnetic layer in insulative relationship with respect thereto and arranged for defining an inductive loop there around.

References Cited by the Examiner

UNITED STATES PATENTS

| | | | |
|---|---|---|---|
| 2,997,695 | 8/1961 | Conger et al. | 340—174 |
| 3,015,807 | 1/1962 | Pohm et al. | 340—174 |

BERNARD KONICK, *Primary Examiner.*

S. M. URYNOWICZ, *Assistant Examiner.*